SIMPLIFIED PULSE WIDTH MODULATED AMPLIFIER

Filed Nov. 29, 1966 4 Sheets-Sheet 1

INVENTORS
GEORGE C. GUCKER
PAUL H. DAITCH
BY
[signature]

INVENTORS
GEORGE C. GUCKER
PAUL H. DAITCH
BY
[signature]

SIMPLIFIED PULSE WIDTH MODULATED AMPLIFIER

Filed Nov. 29, 1966 4 Sheets-Sheet 3

SIMPLIFIED PULSE WIDTH MODULATED AMPLIFIER

United States Patent Office 3,509,479

Patented Apr. 28, 1970

3,509,479

SIMPLIFIED PULSE WIDTH MODULATED AMPLIFIER

George C. Gucker, Howard Beach, and Paul H. Daitch, Elmhurst, N.Y., assignors to Sperry Rand Corporation, Ford Instrument Company Division Filed Nov. 29, 1966, Ser. No. 597,666

Int. Cl. H03f *21/00*

U.S. Cl. 330—10 5 Claims

ABSTRACT OF THE DISCLOSURE

A power supply circuit for driving a load and including a power source coupled to the load through a power switch. Incoming signals for application to the load are summed with a varying waveform signal preferably of the saw-tooth variety, which signal is at a substantially higher frequency than the incoming signal. A threshold circuit normally disables the power switch thereby disconnecting source from load when the output of the summing circuit is less than a positive threshold level and greater than a negative threshold level. The power source is selectively connected to the load through the power switch which is enabled when the positive threshold level is exceeded or when the output of the summing circuit is less than negative threshold level. The polarity of the current supplied to the load is dependent upon whether the output of the summing circuit is either greater than the positive threshold level or less than the negative threshold level.

The instant invention relates to amplifiers and more particularly to variable pulse width modulated amplifiers capable of developing a large amount of power at very high efficiency.

The present state of the art of electronic component miniaturization and interconnection permits the packaging of electronic circuitry in extremely small volumes. Unfortunately, however, the benefits of component miniaturization are lost to a great extent when fabricating circuitry which must dissipate large amounts of power. In such circuitry, for example, the conventional output stage of a servo amplifier requires such large heat sinks for the output transistors and such large power sources necessary to drive the transistors that it places a limit on the overall size reduction which is possible in a design of such circuitry. A novel concept in power amplifier design has been developed which permits a radical improvement in the operating efficiency and hence in the overall package size of this general category of circuitry.

For purposes of comparison, the operation of a conventional transistor amplifier power output stage of the common emitter or common collector type will first be considered. For D.C. operation efficiency is relatively high when the output voltage is very close to the supply voltage. However, efficiency decreases linearly with decreases in output voltage because of the power dissipated in the transistor. Hence, during long term operation at lower voltages, for example, in a servo amplifier which normally operates near its null position, a considerable amount of power dissipation occurs in the output transistor. This operation requires the use of either extremely large output transistors or extensive heat sinks. The above considerations are also true with respect to operation of conventional A.C. output stages to which maximum efficiency obtainable is 78% which occurs when the peak of the output voltage is equal to the magnitude of the supply voltage. Efficiency of A.C. amplifiers decreases as the square of the decrease in output voltage.

The instant invention provides a novel circuit concept which is based upon the use of a pulse width modulation technique that can in many cases do away entirely with the need for heat sinks and also result in substantial reduction of the power requirements. The novel circuit of the instant invention is comprised of means for producing a triangular signal whose D.C. level is shifted by the instantaneous value of the input signal. Comparison means are provided for sensing the instantaneous voltage of the resultant wave form and selectively connecting or disconnecting power amplifier means from a load circuit whenever the instantaneous voltage value sees an upper or lower threshold. The length of time that the power amplifier is coupled to the load is a function of the instantaneous level of the input signal. The output of the power amplifier is smoothed so as to provide a substantially constant output to the load during steady state operation.

It is therefore one object of the instant invention to provide a novel pulse width modulated power amplifier means capable of developing a large amount of power at a high operating efficiency.

Another object of the instant invention is to provide a novel pulse width modulated amplifier comprising means for modulating a repetitive wave form signal with an input signal for altering the D.C. level of the repetitive wave form signal and means for coupling a power amplifier to a load circuit only during those time periods wherein the instantaneous value of the resultant wave form exceeds predetermined threshold levels.

These and other objects of the instant invention will become apparent when reading the accompanying description and drawings in which:

FIGURES 1*a* and 1*b* are schematic diagrams showing conventional output stage configurations.

FIGURE 1*c* is an equivalent circuit diagram for either of the output stage configurations of 1*a* and 1*b*.

FIGURE 1*d* is a plot showing the operating efficiency of conventional output stages of both the D.C. and A.C. type.

FIGURE 2*a* is a schematic diagram of an ideal pulse width modulated output stage.

FIGURE 2*b* is a plot showing the relationship between operating efficiency and output voltage for pulse width modulated circuits and conventional circuits.

FIGURE 3 is a block diagram of a pulse width modulation amplifier designed in accordance with the principles of the instant invention.

FIGURES 4*a* through 4*c* are plots showing wave forms useful in describing the operating principles of the instant invention.

FIGURES 1*a* through 1*d* relate to circuitry and operating characteristics for conventional power amplifiers.

Figure 1A:
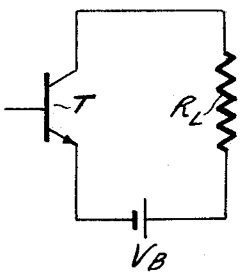
Figure 1B:
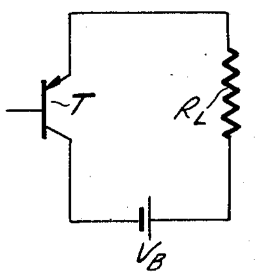

FIGURES 1*a* and 1*b* show the manner in which a load typified by a load resistor $R_L$ is coupled to a transistor amplifier T in either common emitter fashion, as shown in FIGURE 1*a* or common collector fashion, as shown in FIGURE 1*b*.

Figure 1C:
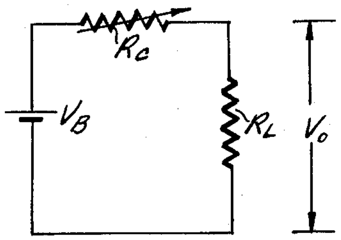
Figure 1D:
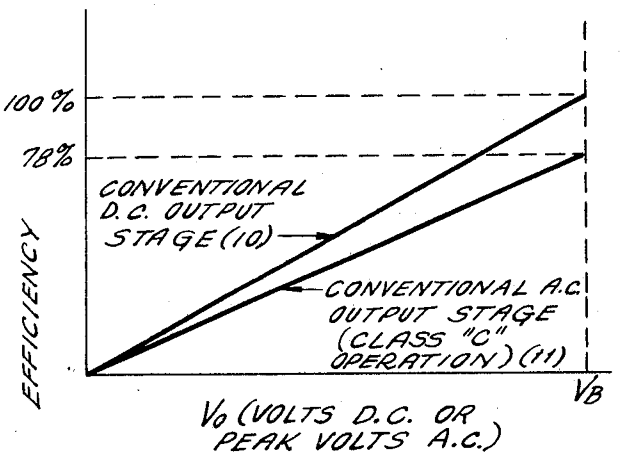

In either amplifier configuration, the driving transistor T may be represented by a variable impedance $R_C$ as shown in FIGURE 1*c*, which impedance element is connected in series with a supply voltage source $V_B$ and the load resistor $R_L$. For D.C. operation, high efficiency of the power amplifier circuit, can be obtained when operating at an output voltage $V_O$ close to the supply voltage value. However, efficiency of the circuit decreases linearly with output voltage due to the power being dissipated in variable resistance $R_C$. Hence, long-term operation at lower voltages (for example, in a servo amplifier which usually operates near its null point) results in a considerable amount of power dissipation in the output transistor (i.e., variable impedance $R_C$). Such appreciable power dissipation requires the use of large output transistors and extensive heat sinks in order not to destroy the circuit components or impair their efficiency.

The above description of the operating characteristics applies with equal force to the operation of a conventional A.C. output stage except that in the A.C. case the maximum efficiency that may be obtained is 78% which occurs when the peak level of output voltage is equal to $V_B$. For the A.C. amplifier case, efficiency decreases as the square of the decrease in output voltage. The efficiency versus output curves 10 and 11 shown in FIGURE 1*d* clearly indicate that efficiency increases to a maximum of 100% for D.C. operation as the output voltage across the load approaches the supply voltage value $V_B$. Curve 11 indicates that maximum efficiency is obtainable for A.C. operation at 78%.

The pulse width modulation technique which is embodied in the circuitry of the instant invention completely does away with the need for heat sinks and substantially reduces power requirements of the amplifier circuitry. A typical circuit design using this technique has currently been developed and has been found to be capable of supplying up to 50 watts of power at total amplifier efficiencies of over 75% throughout the entire range of operation while occupying a volume of only one cubic inch. Other unique advantages of the amplifier are its lack of a "dead zone" which permits much improved linearity, excellent open loop linearity, and relative insensitivity of gain with temperature variation. Whereas the instant invention as described herein is useful for operating D.C. servo amplifiers, it should be noted that the circuit configurations described herein may be employed with equal success in A.C. (carrier) servo amplifiers and audio amplifiers as well.

Figure 2A:
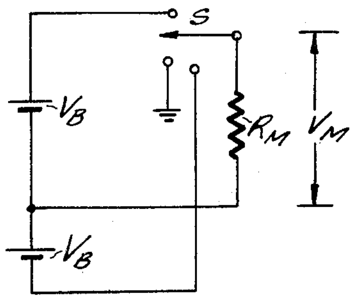

The operation of the pulse width modulated output stage is illustrated schematically in FIGURE 2*a*. The output stage S is characterized as a switch which is cycled to operate at a high frequency *f*, alternately connecting the load $R_M$ to the supply voltage $V_B$ and to ground. The polarity of the supply voltage used depends upon the polarity of the amplifier input signal. The switch S remains on, i.e., connected to the supply voltage, for a time duration *n*, where $n\tau$ is the period of cycling and *n* is a fraction proportional to the magnitude of the amplifier input voltage. Filtering means (not shown and to be described in more detail subsequently) is preferably included in the circuit to smooth the current fed into the load so that a D.C. output current proportional to *n* and hence to the input signal is obtained. An important feature of the amplifier circuit is that its output, input characteristic is linear despite the "ON-OFF" nature of the internal switching circuitry.

Through use of this technique the output voltage is varied by varying the period during which the load is connected to the power source instead of by dissipating extra power in the power transistor circuit. Ideally there are no losses in such a system. In practice, however, there are some small losses due to the saturation impedance of the output switching transistors employed. These losses are generally less than 5%, even at maximum output.

Figure 2B:
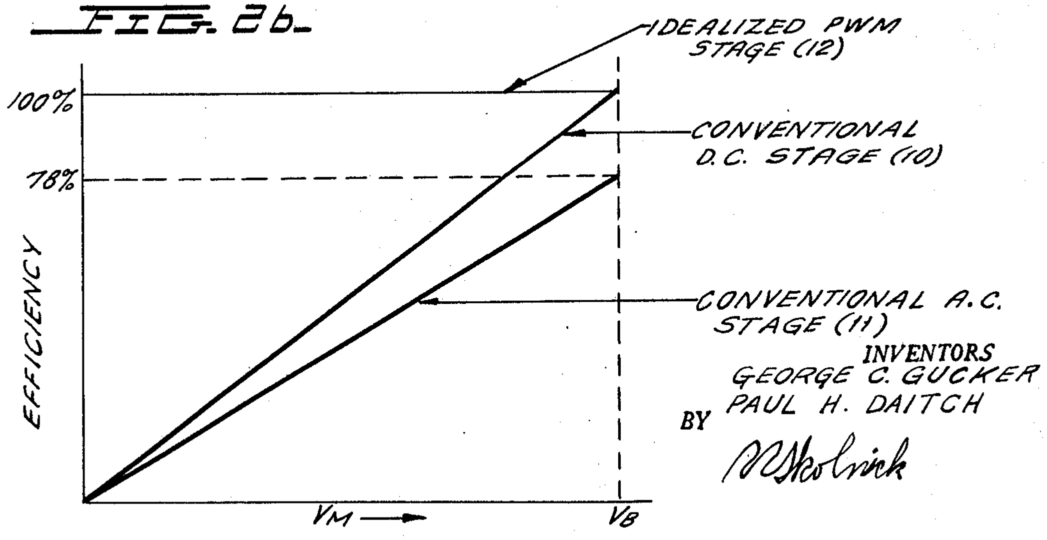

FIGURE 2*b* shows a plot of efficiency versus output voltage developed across the load for a conventional A.C. amplifier, a conventional D.C. amplifier, and the idealized pulse switch modulation amplifier as represented by curves 10 through 12, respectively.

Figure 3:
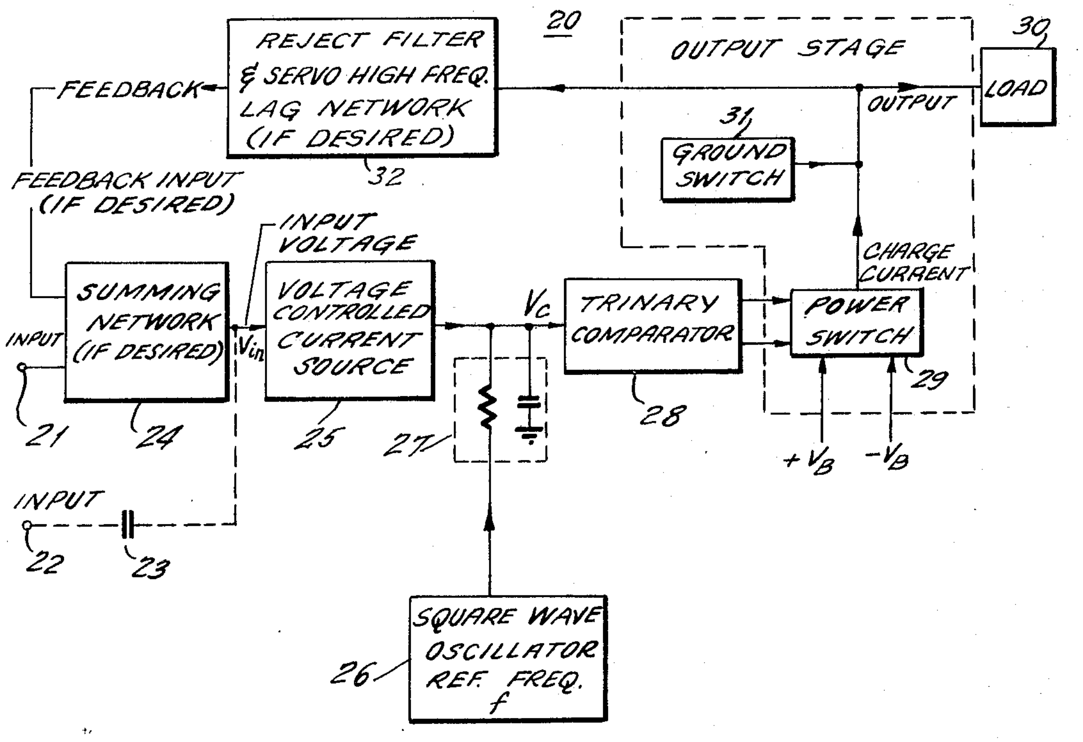
Figure 4A:
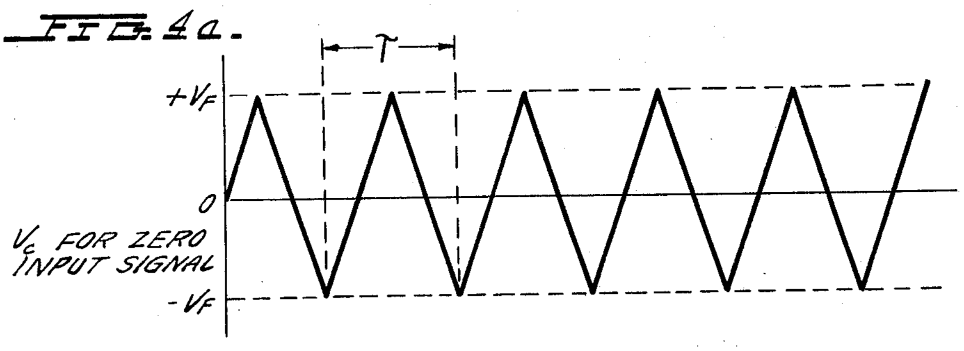

FIGURE 3 shows a block diagram of a pulse switch modulation amplifier 20. The input signal may be applied either at input terminals 21 or 22. If desired, the A.C. input may be capacitively coupled through capacitor 23 directly to the voltage controlled current source 25. The other alternative resides in applying a D.C. signal at input terminal 21 to a summing network 24 which, in turn, is coupled to the input of voltage control current source 25. For a zero input signal level, the voltage control current source 25 operates in conjunction with oscillator 26 and the capacitor charging circuit 27 to supply a triangular wave form shown in FIGURE 4*a* to the input of trinary comparator 28. The triangular wave form has peak positive and negative excursions equal to $+V_s$ and $-V_s$, respectively. The repetition rate or frequency of the wave form of FIGURE 4*a* is equal to *f* wherein the period $\tau$ is equal to $1/f$.

Figure 4B:
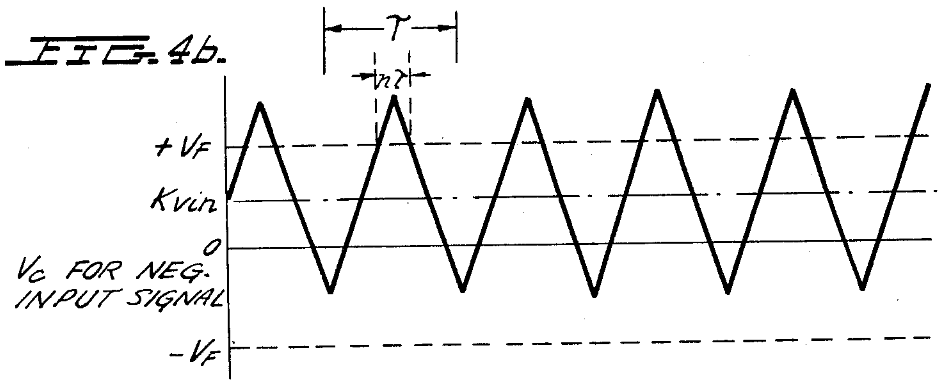

When an input signal $V_{in}$ is applied to the appropriate input terminal 21 or 22, the D.C. level of the triangular wave form is shifted in either a positive or negative direction depending upon the polarity of the input signal. As shown in FIGURE 4*b*, for a negative D.C. input at 21 the D.C. level of wave form $V_C$ is shifted by an amount $K_{V_{in}}$ above the zero reference axis causing the positive peak of wave form $V_C$ to exceed a threshold level plus $V_F$ for a fraction *n* of the total period $\tau$. It should be noted that the quantity *n* is directly proportional to $K_{V_{in}}$. While FIGURES 4*a* and 4*b* do not so indicate, it should be obvious that the D.C. input signal may be positive relative to the zero reference axis causing the triangular wave form $V_C$ to go more negative than the minus threshold level $-V_F$.

The triangular wave form, together with its D.C. level, is applied to the input of a trinary comparator circuit 28 which operates under control of the instantaneous level of the input signal to operate power switch 29.

The trinary comparator has three stable states. If the positive peak voltages of wave form $V_C$ not exceed $+V_F$ or if the negative peaks of wave form $V_C$ not go more negative than the minus threshold $-V_F$, the power switch 29 operates as an open circuit. If the positive excursion of $V_C$ wave form exceeds threshold $+V_F$, the power switch 29 is operated to apply full positive supply voltage to load 30. Also if the negative excursion of wave form $V_C$ is less than threshold $-V_F$, the full negative supply voltage is applied to load 30. In the event that the positive and negative peaks of wave form $V_C$ exceed both thresholds, alternate application of the positive and negative supply voltage to the load 30 will occur. As long as this condition exists, the amplifier gain is doubled and more power is dissipated in the output stage.

Figure 4C:
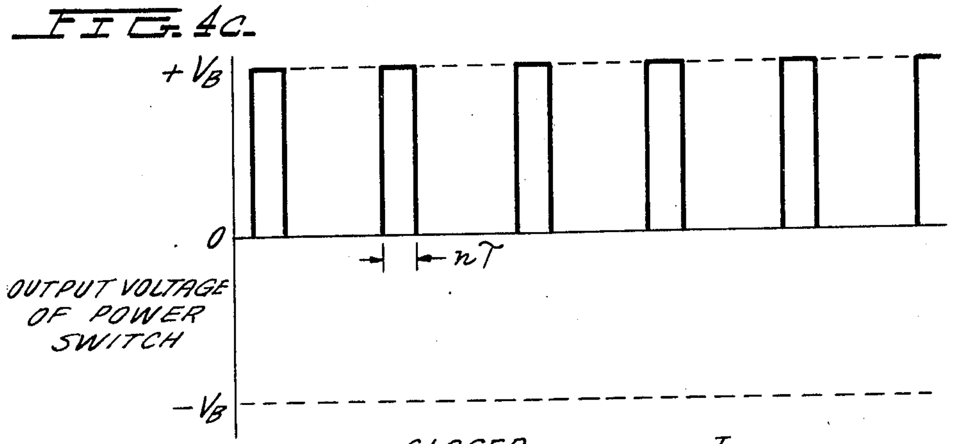

For the case illustrated in FIGURE 4*b* where $V_{in}$ is negative, the voltage output of the power switch is as shown in FIGURE 4*c* where full supply voltage $+V_B$ is applied to the output for a fraction *n* of each cycle of the triangular wave form. During the remaining fraction of this cycle, $(1-n)$ power switch 29 is opened and the ground switch 31 is closed so as to connect the output terminal to ground. If the amplifier of FIGURE 3 is to be used in a D.C. servo, a reject filter and servo high frequency lag circuit 32 may be employed to provide an additional input to summing network 24.

Substantially no "dead" space occurs (i.e., power switch always off) if the peak to peak value of wave form $V_C$ equals or exceeds $2V_F$. Gain stability with temperature depends solely on its stability of signal $V_F$ and the peak to peak value of wave form $V_C$.

Figure 5:
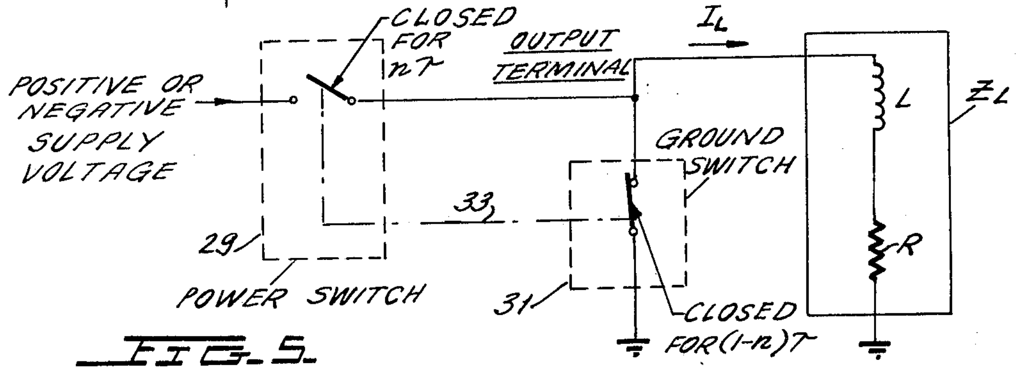
FIGURE 5 is a functional schematic diagram of an output switching circuit which may be employed in the amplifier of FIGURE 3.

The operation of the output switching circuits is illustrated in FIGURE 5 for the case in which the load $Z_L$ includes both a resistive R and an inductive L component. The power switch applies full supply voltage to the load for a time duration $n\tau$ building up a current $I_L$ in the load impedance $Z_L$. Simultaneously with the opening of power switch 29, the supply voltage is removed and ground switch 31 is closed. This cooperating action is shown by the dotted line 33 of FIGURE 5. With the removal of the supply voltage, the voltage across inductor L will reverse and tend to maintain current $I_L$ through the path provided by ground switch 31. After several operating cycles the circuit reaches a steady state condition developing a D.C. current proportional to $n$ flowing in impedance $Z_L$. Neglecting diode and transistor voltage drops, the D.C. load current is:

$$I_{D.C.}=\frac{{}_nV_B}{RL}$$

Superimposed upon this D.C. output will be a ripple current. The magnitude of the ripple current is a function of $n$, L, R and $f$. In general it is possible to select an operating frequency for the generating source which is sufficiently high to reduce ripple to a suitably small value for any given applications. When no inductance is present in the load, it is generally desirable to add a suitable value in series with the load.

Figure 6:
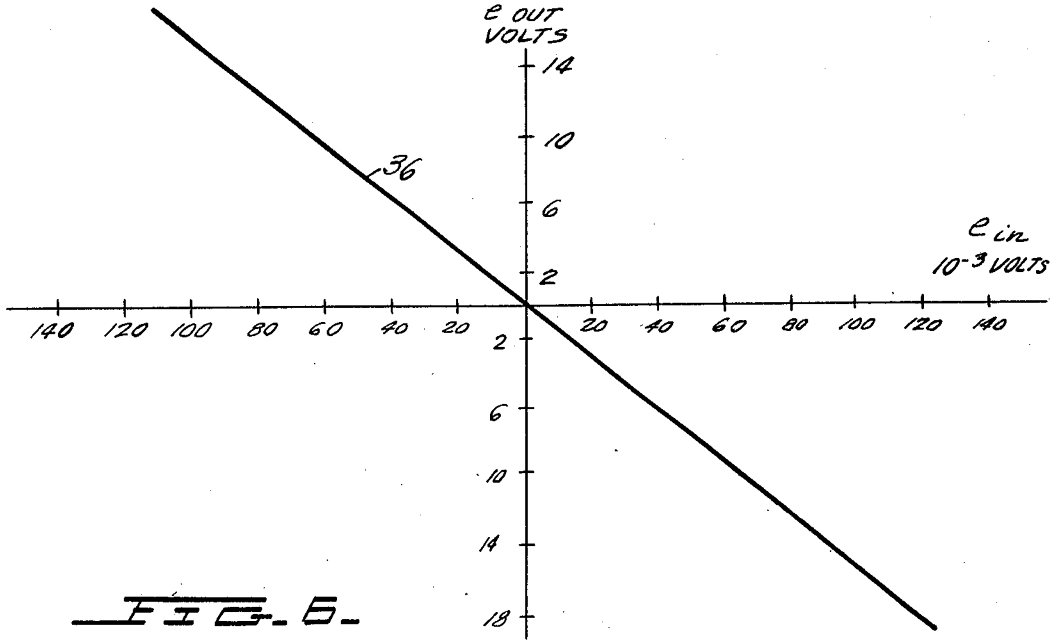
FIGURE 6 is a plot showing the linear D.C. gain of a minimum gain amplifier.

FIGURE 6 shows the open loop output-input characteristics from smoothed measurements taken from an amplifier constructed in accordance with the principles of the instant invention. It can clearly be seen from curve 36 that excellent linearity is obtained from this circuit.

Figure 7:
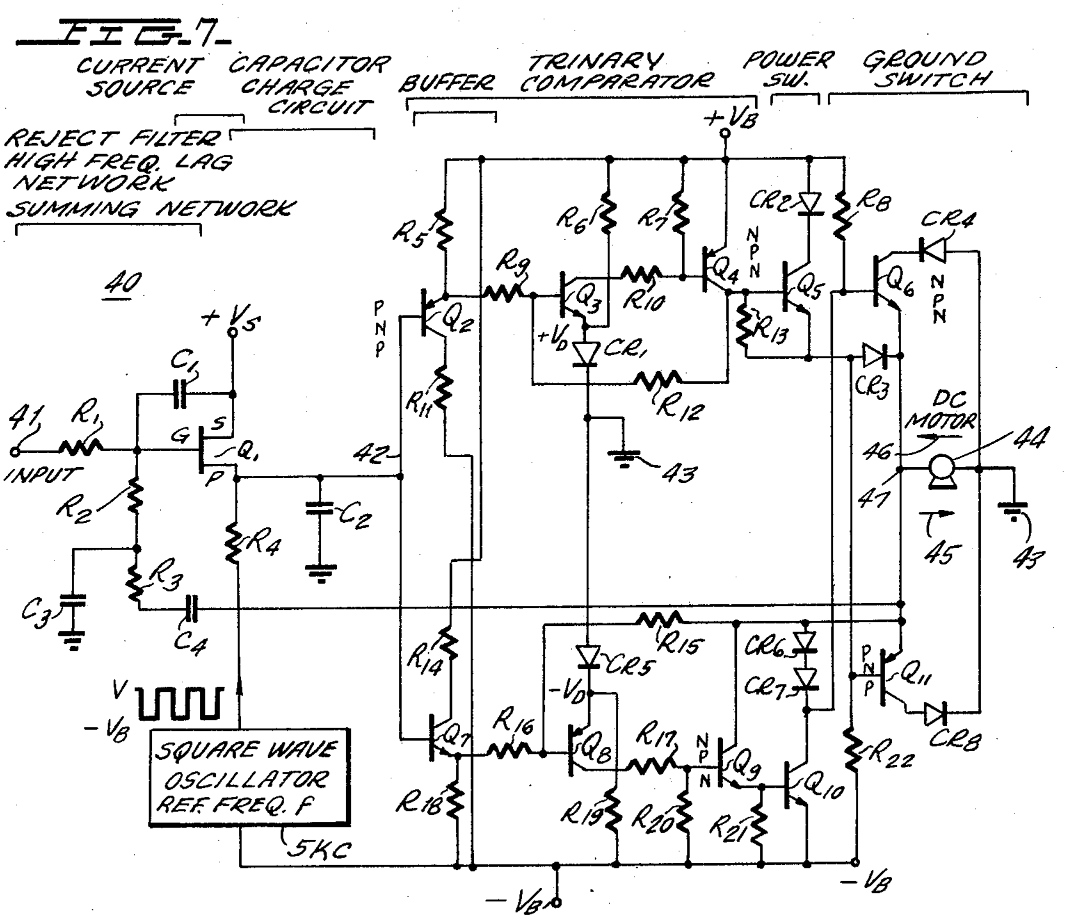
FIGURE 7 is a schematic diagram of a pulse width modulation amplifier used in driving a D.C. servo with bi-directional drive signals.

FIGURE 7 is a schematic diagram showing a pulse width modulation amplifier in greater circuit detail than shown in FIGURES 3 and 5. The circuit 40 of FIGURE 7 is provided with an input terminal 41 for receiving the D.C. input level. This level is applied to the gate of a field effect transistor $Q_1$ which transistor operates as a current source. A square wave oscillator which may, for example, have an operating frequency of 5 kilocycles, has its output terminal coupled through resistor $R_4$ to the drain electrode terminal D of field effect transistor $Q_1$. The current output of transistor $Q_1$, which is proportional to the voltage level of the input signal, and a square wave output are applied to capacitor $C_2$ to charge the capacitor for the purpose of operating the trinary comparator circuit. The components $R_4$ and $C_2$ comprise an integrating circuit for integrating the square wave signal thereby providing the triangular waveform illustrated in FIG. 4*a* which waveform appears at the junction between $R_4$ and $C_2$. The square wave oscillator together with $R_4$ and $C_2$ thereby comprise oscillator means for generating the periodic triangular waveform illustrated in FIG. 4*a*. The current output of the drain electrode of the transistor $Q_1$, which is proportional to the voltage level of the input signal, is added to the triangular waveform appearing at the junction between $R_4$ and $C_2$ thereby providing a summed waveform of the nature illustrated in FIG. 4*b*. The junction of $R_4$ and $C_2$ thus may be considered as a summing junction in that the triangular waveform and the signal proportional to the input voltage is summed thereat. This summed waveform appears at terminal 42 and is simultaneously applied to the base electrodes of transistors $Q_2$ and $Q_7$. These transistors are coupled in emitter-follower fashion and function as buffer amplifiers to provide impedance matching between the capacitor $C_2$ and the inputs of the trinary comparator circuit. The emitter electrodes of transistors $Q_2$ and $Q_7$ are coupled through resistors $R_9$ and $R_{16}$, respectively to the base electrodes of transistors $Q_3$ and $Q_8$, respectively. Considering transistor $Q_3$ of the trinary comparator circuit, this transistor will conduct when its base electrode goes more positive than the emitter which is approximately at $+V_D$. The conduction of transistor $Q_3$ establishes a current path from $+V_B$ through transistor $Q_4$, resistor $R_{10}$, transistor $Q_3$ and diode $CR_1$ to ground potential 43. This current causes transistor $Q_4$ to conduct which in turn provides base current to transistor $Q_5$ causing it to saturate and establish a large magnitude current path from $+V_B$ through $CR_2$ transistor $Q_5$, diode $CR_2$ and the winding (not shown) of D.C. motor 44 to ground potential 43. Some current from the second current path will also pass through resistor $R_{22}$ causing base electrode of transistor $Q_{11}$ to drive the transistor into cutoff. Hence current will flow through the D.C. motor in the direction shown by arrow 45.

Considering the complimentary circuitry of the trinary comparator, when the voltage level at the base electrode of transistor $Q_8$ goes negative this transistor will conduct, allowing current to flow in resistor $R_{17}$ causing transistor $Q_9$ to conduct. The conduction of transistor $Q_9$ causes transistor $Q_{10}$ to conduct developing a high magnitude current path from $-V_B$ through transistor $Q_{10}$, diodes CR7, CR6 and D.C. motor 44 to ground potential 43. It will be noted in this case that the current direction is shown by arrow 46 which current direction is opposite that of the current direction established by the upper circuitry of the trinary comparator.

An additional current path is established from $-V_B$ through transistor $Q_{10}$ and resistor $R_8$ to $+V_B$. This establishes a negative voltage level at the base electrode of transistor $Q_6$ to prevent it from going into conduction.

The above descriptions cover operations wherein the instantaneous voltage value of the resultant input wave form exceeds either the upper or lower threshold levels. In the case where the resultant input signal wave form fails to exceed both upper and lower levels then neither transistor $Q_5$ nor transistor $Q_{10}$ will conduct. Cutoff of transistor $Q_5$ removes the voltage drop across resistor $R_{22}$ thereby providing a negative bias to the base electrode of transistor $Q_{11}$ which establishes a closed circuit path through the winding of D.C. motor 44, transistor $Q_{11}$ and semiconductor $CR_8$ to ground potential 43. Thus, if the current in the winding was flowing in the direction shown by arrow 46 just before cutoff, a short circuit path to ground will be provided through conductor transistor $Q_{11}$.

In the case where transistor $Q_{10}$ goes to cutoff, the voltage drop across resistor $R_8$ is removed causing the voltage at the base electrode of transistor $Q_6$ to go positive driving transistor $Q_6$ into conduction. Thus a closed loop current path is established when transistor $Q_6$ goes into conduction and a closed loop current path is established through transistor $Q_6$, the winding of motor 44 and semiconductor $CR_4$.

Summarizing the operation, if the instantaneous voltage level of the resulting input wave form is between the threshold levels, a closed looped path is provided in the ground switch circuitry to accommodate the current flow in the motor winding regardless of which direction the current was flowing in prior to the instantaneous input voltage level moving between the threshold limits. If the instantaneous input level sees the upper threshold, large magnitude current is fed into the D.C. motor winding in a first direction. When the other threshold level is surpassed large magnitude current flows into the motor winding in the opposing direction, thus providing a continuous path either between the current source and load (or winding), or through a closed loop containing only the load motor (or winding).

A feedback path may be provided between terminal 47 and the gate input G of the field effect transistor $Q_1$ through the series path comprised of capacitor $C_4$ and resistor $R_3$, $R_2$. The circuit operates as a reject filter and high frequency lag network together with capacitor $C_3$. Positive feedback paths exist between the collectors of transistors $Q_4$ and $Q_9$ and the base electrodes of transistors $Q_3$, $Q_8$, respectively, through resistors $R_{12}$ and $R_{15}$, respectively, to speedup the switching of the voltage outputs of the trinary comparator circuit.

Figure 8:
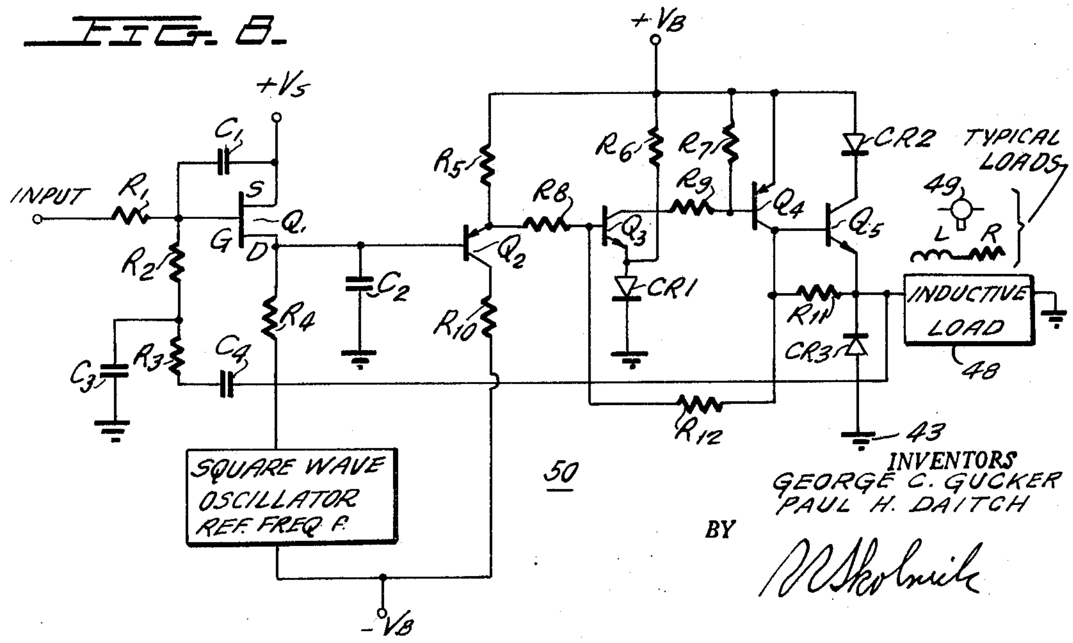
FIGURE 8 is a schematic diagram of a pulse width modulation amplifier for driving a load in only one direction.

FIGURE 8 is a schematic diagram of a variable pulse width modulation circuit 50 in which the inductive load 48 provided therein is driven in one direction only. It should be noted in the arrangement of FIGURE 8 that like elements as between FIGURE 8 and FIGURE 7 are designated by like numerals. In operation the circuit 50 operates upon negative excursions of the resulting input wave form causing the power switch transistor $Q_5$ to feed high magnitude current through diode $CR_2$ and transistor $Q_5$ into the inductive load 48 which may either be a motor winding 49 or an impedance load comprised of inductor L and resistor R. It should be noted that diode $CR_3$ blocks the output current from the power switch from ground potential 43. When power switch transistor $Q_5$ is driven into cutoff, a closed loop current path is established through inductive load 48, ground potential 43 and diode $CR_3$ back to the inductive load to permit continuity of current flow therethrough. If desired the amplifier FIGURE 8 may be employed to provide for operation under control of positive excursions in the same manner as has already been described.

Several D.C. servo amplifier using the concepts described herein have been developed and tested. It has been found that the use of such amplifiers reduces the battery requirements of one system application to 700 watts-seconds as opposed to the 2000 watts-seconds that have been required with conpentional amplifiers. This of course, yields a significant space saving as does the fact that the output transistors (i.e., the power switch) do not require heat sinks or other radiating devices.

The following are typical specifications of an amplifier having the design shown in FIGURE 7.

Maximum output power—50 watts
Maximum output voltage—28 volts
Input Impedance (open loop)—1 megohm
Voltage Gain (closed loop)—44 db
Oscillator frequency—5 kilocycles
Minimum output stage efficiency—75%
Total occupied volume—1 cubic inch In general, the circuitry used to implement the basic idea may be varied depending upon the required power, voltages available and frequency response required.

The trinary comparator circuit could be altered and replaced by any other suitable type of voltage level detector. The field effect transistor amplifier can be replaced by any other suitable type of current source. The filter and lag network design is dependent on the frequency characteristic of the load. The buffer stages may be eliminated if the comparator circuitry is changed. If the motor is to be driven in one direction only, then the ground switch becomes a diode which permits current flow in the motor when the power switch is opened as is the case with the diode $CR_3$ shown in FIGURE 8.

It can therefore be seen from the foregoing that the instant invention provides a novel pulse width modulation amplifier having extremely high operating efficiency, providing high magnitude current to an inductive load and substantially eliminating the need for heat sinks thereby greatly reducing the overall size of the circuitry.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. Amplifier means comprising:
means for receiving an input signal to be amplified and providing a signal proportional thereto;
oscillator means for generating a periodic wave form having an operating frequency substantially higher than the frequency of said input signal;

means for summing said signal proportional to said input signal and said oscillator output;
a source of electrical power;
a load;
normally disabled power switch means being coupled between said source and said load and having control means;
threshold means coupled between said power switch control means and said summing means for enabling said power switch means when the instantaneous output level of said summing means achieves a predetermined threshold level to thereby connect said source to said load; and
ground switch means for coupling said load to ground potential whenever the instantaneous value of said summing means output is below said predetermined threshold level.

2. The device of claim 1 wherein said threshold means includes means for enabling said power switch means whenever the instantaneous level of the summing means achieves a threshold level which is positive relative to ground potential.

3. The device of claim 1 wherein said threshold means includes means for enabling said power switch means whenever the instantaneous level of the summing means achieves a threshold level which is negative relative to ground potential.

4. The device of claim 1 wherein said threshold means includes:
first means for establishing a positive threshold level relative to ground potential,
and second means for establishing a negative threshold level relative to ground potential,
said power switch means including means responsive to said first means for feeding current in a forward direction to said load from said source when said instantaneous output level of said summing means achieves said positive threshold level;
and means responsive to said second means for feeding current in a reverse direction to said load from said service when said instantaneous output level of said summing means achieves said negative threshold level.

5. The device of claim 4 wherein said ground switch means is comprised of:
means for providing a shunt path for current flowing in said forward direction through said load;
and means for providing a shunt path for current flowing in said reverse direction through said load whenever the instantaneous level of the summing means output fails to reach either threshold level.

References Cited

UNITED STATES PATENTS

| | | | |
|---|---|---|---|
| 3,213,343 | 10/1965 | Sheheen | 318—341 |
| 3,223,912 | 12/1965 | Sheheen | 318—341 |
| 3,337,693 | 8/1967 | Silverstein | 330—9 X |

NATHAN KAUFMAN, Primary Examiner

U.S. Cl. X.R.

307—240; 330—24, 38